United States Patent Office 3,114,718
Patented Dec. 17, 1963

3,114,718
METHOD FOR IMPROVING THE CATALYTIC ACTIVITY OF THE TITANIUM TETRACHLORIDE-ZINC DIMETHYL SYSTEM
Clayton Trevor Elston, Kingston, Ontario, Canada, assignor to Du Pont of Canada Limited, Montreal, Quebec, Canada, a corporation of Canada
No Drawing. Filed Nov. 21, 1960, Ser. No. 70,451
Claims priority, application Canada Nov. 24, 1959
10 Claims. (Cl. 252—429)

This invention relates to a method for preparing polymerization catalysts. More particularly, the invention about to be described has reference to an improved method for preparing coordination catalysts from organozinc compounds, which catalysts are highly useful in the polymerization of alpha-olefins and specifically ethylene into high molecular weight polymers.

The polymerization of ethylene in particular and alpha-olefins generally into high molecular weight polymers can be effected by extreme conditions of temperature and pressure or, more advantageously, at near-ambient conditions by employing a suitable catalyst. A particularly useful class of catalysts, termed coordination catalysts, result from the reaction of an organometallic compound with a transition metal halide. Exemplary of such catalysts are the ones formed from the equilibration of titanium tetrachloride with organometallic compounds such as the aluminum trialkyls and the Grignard reagents, which react ultimately to form a complex containing the transition metal in a reduced valence state.

There are a considerable number of systems which exhibit coordination catalytic activity. Primary among these are the ones mentioned in Belgian Patent Nos. 533,362 (filed November 16, 1954), 534,888 (filed January 14, 1955), 538,782 (filed June 6, 1955), 540,459 (filed August 9, 1955), and 543,259 (filed November 30, 1955) to K. Ziegler et al. However, included among the catalyst systems exemplified therein are those which differ quite widely in their relative efficacies. Among the most active systems are those obtained from aluminum alkyls and titanium tetrachloride.

The above-mentioned patents also refer generally to catalyst systems based on zinc and cadmium alkyls; Belgian Patent No. 548,895 (filed June 22, 1956) to Stamicarbon N.V., is specific to the use of such compounds in the preparation of coordination catalysts. However, the use of organozinc compounds as catalyst intermediates has heretofore been decidedly unattractive, due primarily to the low yield of polymer obtained with the catalysts prepared therefrom, i.e., due to their low order of catalytic activity.

In accordance with the present invention, it is now possible to obtain quite active coordination catalysts based on reactions with organozinc compounds. This is accomplished with equilibrating a titanium tetrahalide (fluoride, chloride, bromide, and/or iodide) in an inert solvent with either zinc dimethyl or a zinc methyl halide (also the fluoride, chloride, bromide, or iodide), removing substantially all of the resulting and remaining zinc compounds by filtration, distillation, and/or other suitable techniques, then converting the resulting substantially zinc-free titanium compound(s) into active catalytic species by heating, irradiation, or the similar procedures. There results from such treatment a catalyst system of excellent activity, one which is capable of converting ethylene and/or other alpha-olefins into high molecular weight polymers or copolymers in good yield.

In the preferred embodiment, the invention is carried out in cyclohexane, utilizing titanium tetrachloride and zinc dimethyl. Equilibration is effected by refluxing substantially equimolar amounts of the reactants in excess solvent for a brief period. Removal of the zinc compounds is then effected by filtration, to remove zinc chloride and by distillation during refluxing to remove any remaining zinc dimethyl. Conversion to the active catalyst is then brought about by an abbreviated exposure to ultra-violet radiation. Throughout the process, the reaction mixture is protected from contamination by atmospheric moisture and oxygen.

It is presently believed that the process of this invention depends on the completeness of removal of the zinc by-product of the initial equilibration or "prereduction" reaction. Otherwise they remain to diminish over-all catalytic activity by diverting the active reduced-valence titanium catalyst through various reversible equilibria which lead to the formation of inactive species. However, when substantially all of the zinc compounds are removed, no such diverting equilibria can occur.

While the initial equilibration between the reactants will proceed satisfactorily at room temperature, it is preferred to accelerate the reaction by heating the solution of reactants, e.g., at the boiling point of the solvent. Similarly, while the conversion of the titanium compound(s) resulting from the equilibration, which compounds have the general composition $TiX_m(CH_3)_n$, where $m+n=4$, will take place at room temperature, it also is preferred to accelerate the conversion by supplying energy to the system, e.g., by heating or irradiating the solution. The reduced compounds have the same general formula as given above except that $m+n<4$. Both the equilibration (prereduction) and the conversion (reduction) reactions are accompanied by colour changes, hence the extent of reaction can be estimated visually or, if a more accurate indication is required, colourimetrically.

The catalyst preparation usually is carried out in an inert diluent in the substantial absence of contaminants which react with the compounds being employed, such contaminants primarily being atmospheric oxygen and moisture but also including impurities in the solvent, such as alcohols, water, and the like. Suitable inert solvents include aliphatic, aromatic, and cycloaliphatic hydrocarbons such as heptane, toluene, and cyclohexane respectively. The titanium tetrahalide is generally employed in concentrations ranging from 0.001 to 1.0 moles per liter of solution. Lower concentrations may give use to problems associated with unavoidable contaminants in the solvent while at higher concentrations, difficulties in controlling the rate of the equilibration reaction may be encountered. The zinc compound is usually employed in molar concentrations approximating that of the titanium halide. However, in the case of zinc dimethyl, as little as one-half that molar concentration will often suffice. While the use of larger quantities of the zinc compound will enhance the rate of the equilibration reaction, the use of smaller quantities has the advantage that proportionately more of the remaining zinc will be present in the form of the insoluble halide, hence more readily separable.

The substantially complete removal of zinc-containing compounds subsequent to equilibration may be effected by any suitable means, provided that contamination of the prereduced titanium compound(s) is avoided. The separation may be effected mechanically by decantation or filtration techniques when the zinc compound is a solid, i.e., zinc halides, or by distillation when the zinc compound is a liquid, i.e., zinc methyl halide or zinc dimethyl. In some instances, fractionation may be necessary. Often the volatile zinc compounds can be removed during the latter stages of equilibration merely by additional refluxing.

The following non-limiting example will illustrate a preferred embodiment of the instant invention.

*Example*

Into a small reaction vessel blanketed with dry nitrogen are placed 41 mls. of purified cyclohexane, 10 mls. of a 0.472 molar solution of titanium tetrachloride in cyclohexane, and 8.6 mls. of a 0.544 molar cyclohexane solution of zinc dimethyl, upon which the resulting solution turns yellow in colour and a precipitate of zinc chloride commences to form. The mixture is then refluxed for 5 minutes, during which time the precipitation of zinc chloride continues and unreacted volatile zinc compounds are voided. The mixture is then filtered under nitrogen to complete the removal of zinc compounds, viz., zinc chloride. A 3.2-ml. portion of the clear yellow filtrate (containing 0.25 millimole of the corresponding prereduced titanium compound) was added to a polymerization vessel containing 200 mls. of pure cyclohexane saturated with ethylene gas. The polymerization vessel is operated at ambient temperature and under about 20 mm. pressure of ethylene gas. The resulting solution is irradiated with an ultra-violet lamp for two minutes to initiate reduction of the catalyst; irradiation causes the solution to turn brownish-black in colour and absorb ethylene at a rapid rate. The yield of high molecular weight polyethylene is 12.0 grams. When the above example is repeated except that only 4.31 mls. of a 0.544 molar cyclohexane solution of zinc dimethyl is added to the titanium tetrachloride solution, thereby decreasing further the likelihood of zinc contamination, especially from the volatile zinc compounds, the polymer yield is 12.8 grams. These results demonstrate the excellent activity of catalysts prepared in accordance with the invention.

However, when the original example is repeated except that the catalyst is generated in situ in the polymerization vessel (0.25 millimole of both titanium tetrachloride and zinc dimethyl), leading again to yellow colouration and zinc chloride precipitation, the polymer yield is only 0.5 gram, even though irradiation continues for 5 minutes. When the original example is repeated except that 0.044 millimole of zinc methyl chloride (15 mole percent) is added, the polymer yield after 60 minutes is only 0.86 gram. These results show the deleterious effect in terms of polymer yield of the presence of zinc compounds on the activity of the catalyst.

The process of this invention may be carried out in the presence of the olefin to be polymerized. The polymerization utilizing the catalyst system of the invention may be effected under conditions leading to a slurry of the desired polymer or to a solution thereof (A. W. Anderson et al., U.S. Patent No. 2,862,917, issued December 2, 1958). The catalyst is eminently useful in promoting either homopolymerization or copolymerization of alpha-olefins. Such a catalyst can be prepared rapidly and efficiently. The numerous advantages inherent in this invention will readily occur to those undertaking its practice.

The embodiments of this invention in which an exclusive property or privilege is claimed are defined as follows:

1. In the preparation of active coordination catalysts from titanium tetrahalides and organozinc compounds, the improvement which comprises refluxing a titanium tetrahalide in an inert solvent with a substantially equimolar amount of an organozinc compound selected from the class consisting of zinc dimethyl and zinc methyl halide, removing substantially all of the zinc compounds subsequent to such refluxing, and converting the prereduced titanium compound into an active catalytic species comprising titanium in a reduced valence state by exposing said prereduced titanium compound to an activator selected from the class consisting of irradiation and heat.

2. The process of claim 1 wherein the titanium tetrahalide is titanium tetrachloride.

3. The process of claim 1 wherein the inert solvent is cyclohexane.

4. The process of claim 1 wherein the zinc methyl halide is zinc methyl chloride.

5. The process of claim 1 wherein the zinc compounds are removed by filtration.

6. The process of claim 1 wherein the zinc compounds are removed by distillation.

7. The process of claim 1 wherein the zinc compounds are removed by filtration and by distillation.

8. The process of claim 1 wherein the titanium compound is converted into an active catalytic species by irradiation.

9. The process of claim 1 wherein the titanium compound is converted into an active catalytic species by heating.

10. The active coordination catalyst prepared by the process of claim 1.

References Cited in the file of this patent

UNITED STATES PATENTS 2,911,401  Bull et al. _____ Nov. 3, 1959

FOREIGN PATENTS 548,895  Belgium _____ July 14, 1956

UNITED STATES PATENT OFFICE
CERTIFICATE OF CORRECTION

Patent No. 3,114,718                                December 17, 1963

Clayton Trevor Elston

It is hereby certified that error appears in the above numbered patent requiring correction and that the said Letters Patent should read as corrected below.

In the grant, lines 2 and 3, for "assignor to Du Pont of Canada Limited, of Montreal, Quebec, Canada, a corporation of Canada," read --- assignor, by mesne assignments, to E. I. du Pont de Nemours and Company, of Wilmington, Delaware, a corporation of Delaware, ---; line 12, for "Du Pont of Canada Limited, its successors" read --- E. I. du Pont de Nemours and Company, its successors ---; in the heading to the printed specification, lines 5 to 7, for assignor to Du Pont of Canada Limited, Montreal, Quebec, Canada, a corporation Canada" read --- assignor, by mesne assignments, to E. I. du Pont de Nemours and Company, Wilmington, Del., a corporation of Delaware ---; column 1, line 57, for "with" read --- by ---.

Signed and sealed this 12th day of May 1964.

(SEAL)
Attest:

ERNEST W. SWIDER
Attesting Officer

EDWARD J. BRENNER
Commissioner of Patents